May 2, 1967 W. G. McKENZIE 3,317,002
FLUID DISTRIBUTING SYSTEM
Filed Feb. 8, 1965 3 Sheets-Sheet 1
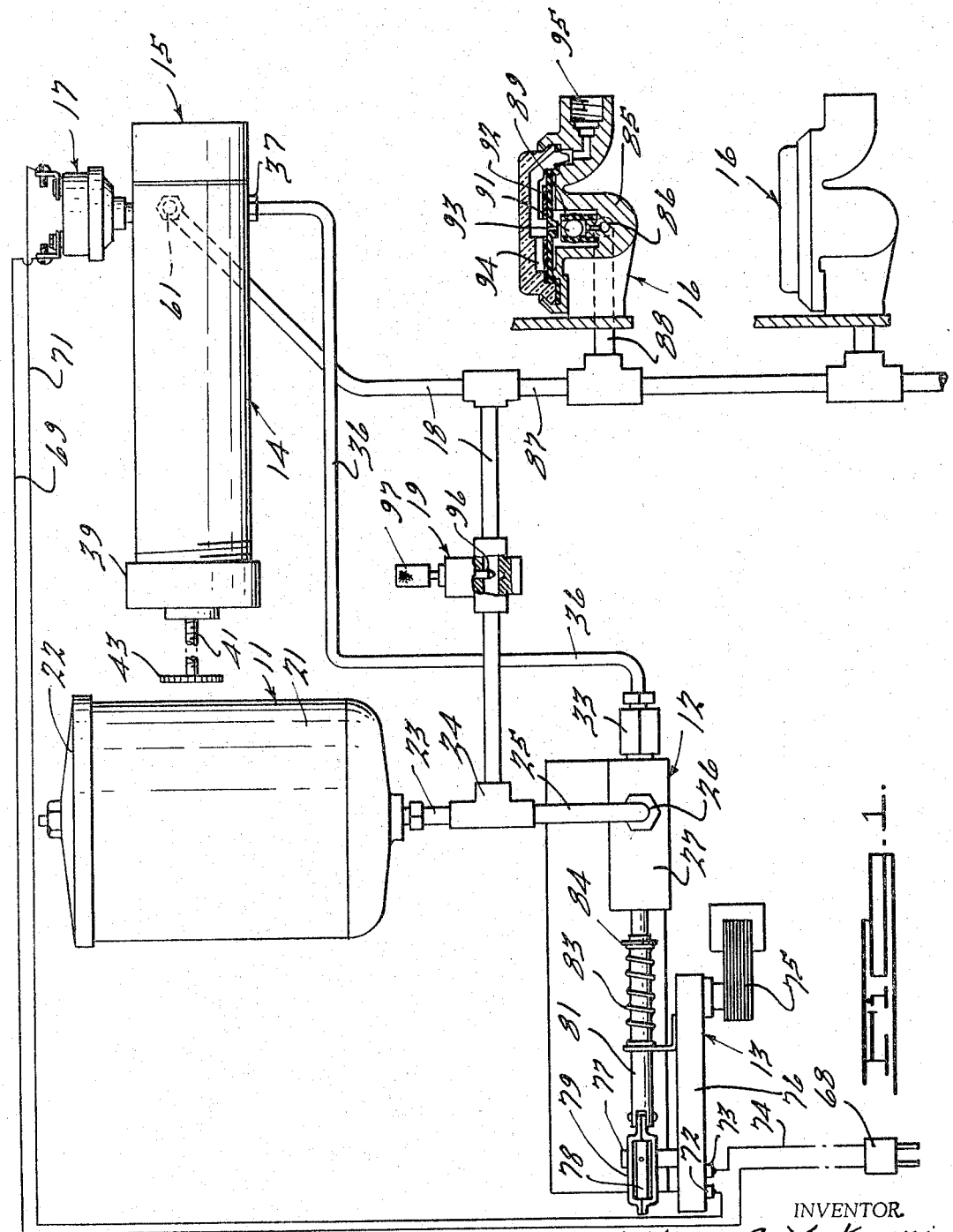
INVENTOR.
William G. McKenzie
BY
James Dickey Pierce
ATTORNEYS.

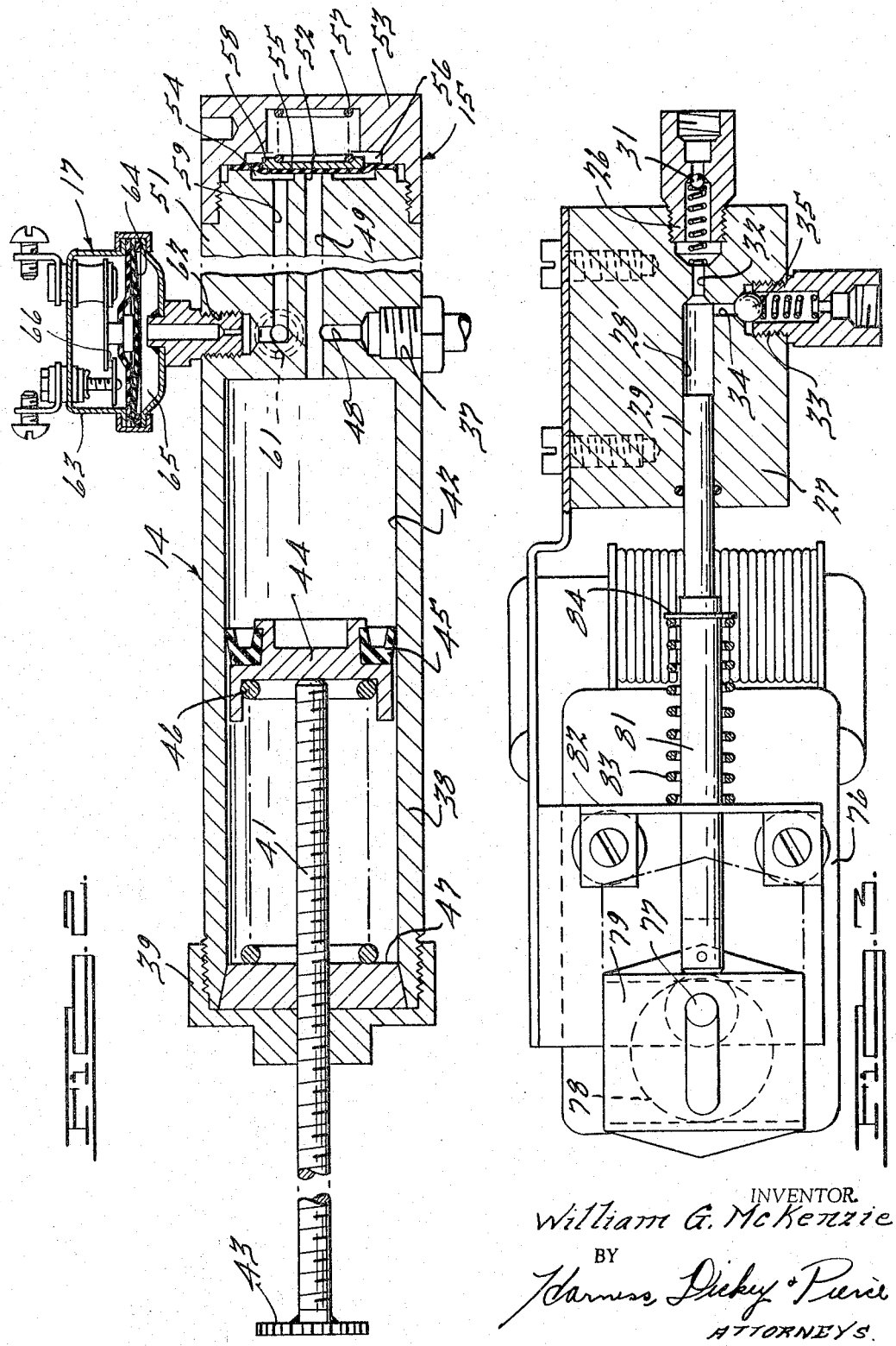

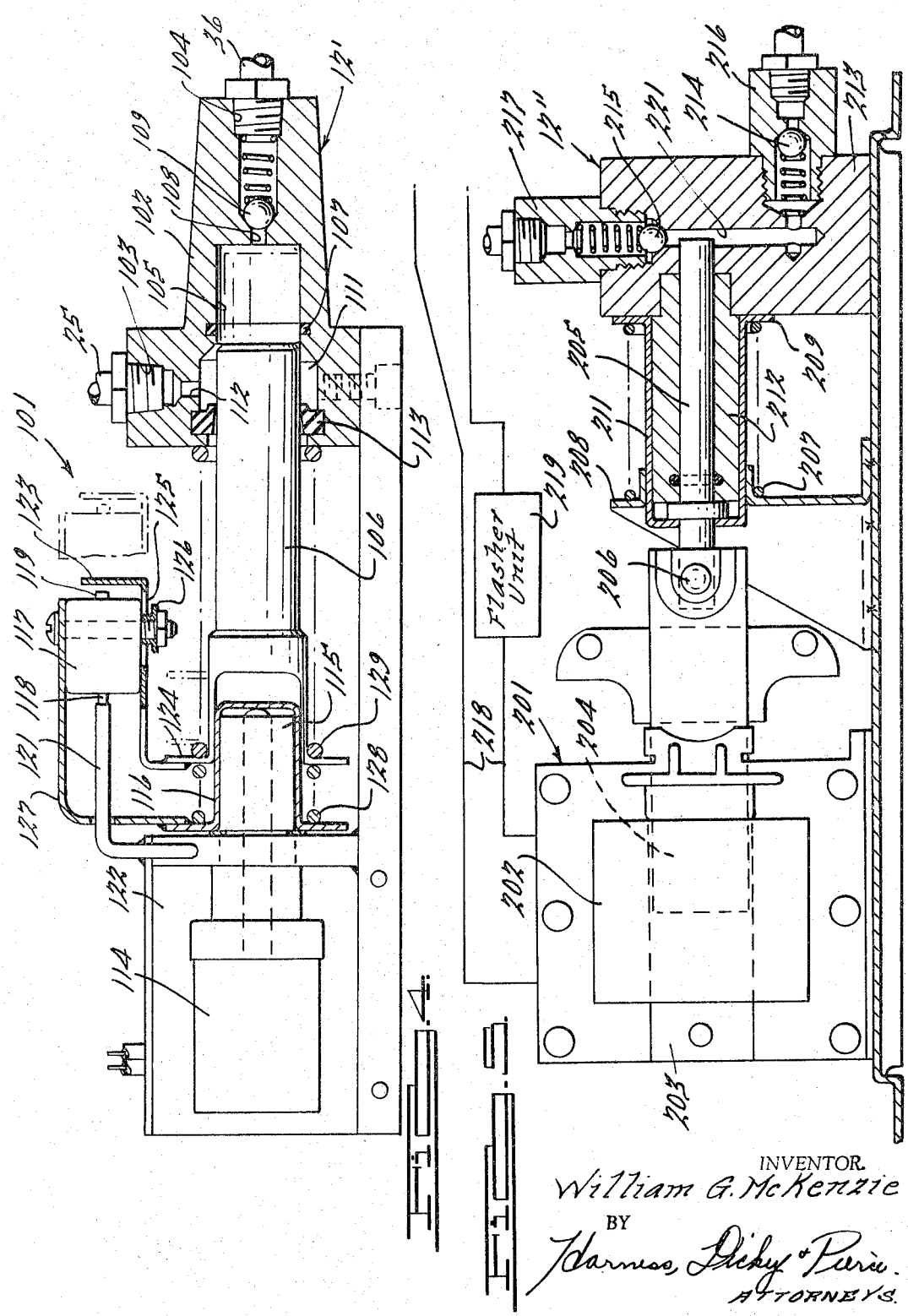

United States Patent Office 3,317,002
Patented May 2, 1967

3,317,002
FLUID DISTRIBUTING SYSTEM
William G. McKenzie, Racine, Wis., assignor to Walker Manufacturing Company, Racine, Wis., a corporation of Wisconsin
Filed Feb. 8, 1965, Ser. No. 430,836
7 Claims. (Cl. 184—7)

This invention relates to fluid distributing systems, and more particularly to periodically actuatable systems for distributing metered amounts of a lubricant or other fluid to a plurality of locations.

It is an object of the present invention to provide a novel and improved fluid distributing system which may be operated with a relatively small and inexpensive power source.

It is another object to provide an improved fluid distributing system of this nature which utilizes a portion of the pumped fluid to control the time delay between cycles, thus eliminating the need for a separate timing device.

It is a further object to provide an improved fluid distributing system having these characteristics, which may be set to a wide variety of cycle times with minimum effort.

It is also an object to provide an improved fluid distributing system of this nature which may be used with different types of metering devices and pumps, is of relatively simple construction and is reliable in use.

Other objects, features and advantages of the present invention will become apparent from the subsequent description, taken in conjunction with the accompanying drawings.

In the drawings:

FIGURE 1 is a schematic view, parts being broken away, showing the complete fluid distributing system with a rotary type of pumping motor;

FIGURE 2 is a detailed cross-sectional view in elevation of the accumulator and relief valve;

FIGURE 3 is a top plan view, partly sectioned, of the pump shown in FIGURE 1;

FIGURE 4 is an elevational view, partly sectioned, of a modified form of pump driving means; and FIGURE 5 is a side elevational view, partly sectioned, of still another type of pump drive.

Briefly, the illustrated embodiment of the invention comprises an accumulator having a piston, the accumulator collection chamber being connected to the outlet of an electrically operated fluid pump, the pump inlet being connected to a reservoir. A stop is provided for limiting piston movement when fluid is delivered to the accumulator, and a relief valve is also connected to the pump outlet port, so that when the limiting position of the accumulator piston is reached, the relief valve will open. The construction of the relief valve is such that it takes a relatively high predetermined pressure to open it, but once it is open it will stay open until the pressure drops to a lower level. The outlet of the relief valve is connected to a plurality of fluid metering valves, these devices being of the type which accumulate predetermined amounts of fluid upon each pressurization. The size of the accumulator is such that it will receive substantially more fluid each time it is charged than is needed to charge all the metering devices to which the fluid is delivered when the relief valve opens.

The line leading from the outlet port of the relief valve to the metering valves is also connected to the resevoir through an adjustably restricted bleedoff line. The accumulator is so constructed as to maintain pressure on its collected fluid after the metering valves have been charged, and this fluid will be returned at a controlled flow rate to the reservoir. When the pressure at the relief valve outlet port has been sufficiently reduced by this return of fluid, the relief valve will close. This will cut off flow to the bleedoff line as well as to the metering valves, and continued pumping of the fluid will recharge the accumulator, thus beginning another cycle.

The illustrated embodiment of the invention also includes a pressure-operated electrical switch which controls operation of the pump driving means. This switch is normally closed, permitting the pump to run, but is connected to the relief valve outlet port and will open at a predetermined relatively low pressure when the relief valve opens. This will de-energize the pump motor so that no fluid will be delivered to the accumulator while the latter is discharging. The pressure at which the pressure-operated switch will reclose is lower than the pressure at which the relief valve will reclose, thus insuring that the pump will not be restarted until the relief valve closes. As pointed out above, once the relief valve does close, it cannot be reopened until a relatively high pressure is attained; that is, when the accumulator is again fully charged.

The means used to drive the pump may be a relatively low power and inexpensively constructed motor. Three types of electrically operated motors are illustrated, one being a rotary motor driving the pump through a cam, another being a reciprocable thermal unit, and a third comprising a periodically energizable solenoid.

Referring to the drawings, and particularly to FIGURE 1 thereof, the system comprises a fluid reservoir generally indicated at 11, a pump generally indicated at 12 which is driven by a motor generally indicated at 13, and an accumulator generally indicated at 14, which is supplied by the pump. A relief valve generally indicated at 15 is connected to the accumulator, and a plurality of metering valves 16 are connected in parallel to the outlet of the relief valve. A pressure-operated switch generally indicated at 17 is also connected to the outlet of the relief valve, and a return or bleedoff line 18 leads from the relief valve outlet through a restriction generally indicated at 19 to the reservoir.

Reservoir 11 comprises a cylindrical container 21 with a removable cap 22 which may be filled with lubricant or other fluid to be metered. A conduit 23 leads downwardly from the lower end of reservoir housing 21 to a T connection 24, which is provided for the connection with return line 18, a conduit 25 leading downwardly from the T connection to the inlet port 26 of pump 12, which is also seen in FIGURE 3.

The pump comprises a housing 27 with a piston chamber 28 therein, the piston chamber enclosing a piston 29. Inlet port 26 is controlled by a check valve 31, and a passage 32 leads therefrom to the end of chamber 28 remote from piston 29. Outlet port 33 of pump 12 is also connected, by a passage 34, to this end of chamber 28 and is controlled by a check valve 35.

A conduit 36 leads from outlet port 33 to the inlet port 37 of accupulator 14. The construction of the accumulator is best seen in FIGURE 2. The accumulator comprises a cylindrical housing 38, one end of which is closed by a cap 39. A rod 41 is threadably mounted in this cap and extends into the chamber 42 enclosed by cylinder 38. The extent of rod 41 into the chamber may be adjusted by rotation of a thumb screw 43 secured to the outer end of the rod.

A piston 44 is slidably mounted within chamber 42, the piston carrying a seal 45 on the side facing away from cap 39. A helical coil compression spring 46 is disposed between the side of piston 44 facing cap 39 and a shoulder 47 at the end of cylinder 38 adjacent cap 39.

Inlet port 37 leads to a cross passage 48 which is in turn connected to a longitudinal passage 49 in the body 51 of accumulator 14 at the end thereof remote from cap 39. Passage 49 is connected with chamber 42 and also leads to the inlet port 52 of relief valve 15.

The relief valve comprises a body 53 in the form of an internally threaded member which is threaded onto the end of housing 51, the latter having a recessed portion facing housing 53 which forms a chamber 54, inlet port 52 leading to this chamber. A diaphragm 55 is secured between facing shoulders on housings 51 and 53 outwardly of chamber 54, separating this chamber from a chamber 56 formed by a recess in housing 53. A helical coil compression spring 57 is disposed within chamber 56, engaging a pressure member 58 which in turn engages the side of diaphragm 55 opposite that which faces chamber 54.

Inlet port 52 protrudes from the bottom of chamber 54, and will be engaged by the central portion of the diaphragm as urged by spring 57. The cross-sectional area of inlet port 52 is substantially less than the area of the diaphragm exposed to chamber 54. An outlet port 59 leads longitudinally from the depressed portion of chamber 54 to a metering valve supply port 61 and a pressure switch supply port 62 in body 51.

It will thus be seen that the unit pressure required to lift diaphragm 55 from its normal position closing inlet port 52 will be substantially greater than the unit pressure required to hold the diaphragm in its right hand or open position once it begins to leave port 52. In a typical example, 100 p.s.i. might be needed at inlet port 52 to open the relief valve, but once it is open, spring 57 will not reclose the valve until the pressure in chamber 54 has been reduced to about 10 p.s.i. These values may of course be varied within the scope of the invention.

Pressure-operated switch 17 is of conventional construction, having a housing 63 within which is disposed a diaphragm 64 forming a chamber 65 connected to port 62. Diaphragm 64 will open contacts 66 in response to the attainment of a relatively low pressure, say 4 p.s.i., in chamber 65, but will permit the contacts to be closed under the urging of a spring (not shown) when the pressure in chamber 65 is reduced below this value.

Switch 17 is in series with a supply source 68 of electrical power, being connected between the wires 69 and 71, as seen in FIGURE 1. Wire 71 leads to one terminal 72 of motor 13, the other terminal 73 being connected to the other side of the power source through a wire 74.

The construction of a pump driving means 13 is seen best in FIGURES 1 and 3, this means comprising a fractional horsepower motor 75 with an attached reducing gear box 76 the output shaft 77 of which carries an eccentric cam 78. This cam is disposed within a cage 79 secured at one end of a plunger 81 slidably mounted above the motor by a bracket 82. A helical coil compression spring 83 is disposed between the bracket and a shoulder 84 fixed to the end of plunger 81 remote from cage 79, thus urging the plunger in a rightward direction as seen in FIGURES 1 and 3.

Piston 29 is secured to the end of plunger 81 adjacent shoulder 84, being slidable in housing 27. Rotation of cam 78 to the position of FIGURE 3 will thus compress spring 83 and withdraw piston 29 from chamber 28, causing fluid to flow from reservoir 21 through conduits 23 and 25 and check valve 31 and passage 32 into chamber 28. As cam 78 continues to rotate past the FIGURE 3 position, piston 29 will be forced to the right in FIGURE 3 by the cam rotation as well as by the expansion of spring 83. This will force fluid from chamber 28 through passage 34, and the past check valve 35 into conduit 36 from where it will flow to the accumulator. Continuous rotation of motor 75 will thus build up a charge of fluid in accumulator 14.

Metering valves 16 may be of any conventional type which alternatively receive a charge of fluid and discharge fluid toward a delivery point. One such metering valve is shown and described in my copending application Ser. No. 209,131, filed July 11, 1962, now United States Patent No. 3,197,088 and assigned to the assignee of the present invention. Briefly, as shown in FIGURE 1, each metering device comprises a housing 85 having an inlet port 86 connected to port 61 of accumulator 14 by a main metering valve supply line 87 and a branch line 88. Inlet port 86 leads to the space within a length of rubber tubing 89, a spherical member 91 being disposed within this tubing. A diaphragm 92 is secured within housing 85 above tubing 89 and ball 91, this diaphragm having a passage 93 which is closable by ball 92 when the latter is moved upwardly by pressure applied beneath it. A chamber 94 is formed above diaphragm 92, this chamber being connected to an outlet port 95 leading to the fluid delivery point, such as a bearing.

Although a detailed description of the operation of this metering device is unnecessary for an understanding of the present invention, it may be stated briefly that upon application of fluid pressure to inlet port 86, ball 91 will close port 93 and fluid will be forced past ball 91 into the chamber below diaphragm 92, the upward expansion of the diaphragm at this time forcing fluid from chamber 94 to outlet port 95. When diaphragm 92 engages the top of housing 85, it will no longer be able to expand, and no more fluid will be accepted by the metering device. A reduction of pressure at inlet port 86 will cause ball 92 to withdraw from its closing position with respect to port 93, and the fluid collected beneath diaphragm 92 will pass through port 93 into upper chamber 94 as the diaphragm contracts, in readiness for delivery to port 95 upon the next application of fluid pressure at inlet port 86.

Adjustable restriction 19 is also of conventional construction, as seen in FIGURE 1, including a needle 96 disposed in partially obstructing relation with respect to fluid flow through conduit 18. Adjustment of thumb screw 97 will move needle 96 into any of various positions, so that the rate of bleedoff from accumulator outlet port 61 to reservoir 11 may be preselected.

In operation of the system, assuming in an initial condition in which piston 44 of accumulator 14 is in its right-hand position, as shown in FIGURE 2, with relief valve 15 closed and switch 17 also closed, pump driving means 13 will cause reciprocation of pump 12, drawing fluid from reservoir 11 and injecting this fluid into chamber 42 of accumulator 14. Spring 46 of accumulator 14 will offer initial resistance to the entry of fluid into chamber 42, but when the fluid pressure reaches some intermediate value, say 60 p.s.i., the force of spring 46 will begin to be overcome, and piston 44 will move to the left. As it does so, fluid will accumulate in chamber 42, relief valve 15 at this time still remaining closed.

The accumulation of fluid will continue until the left-hand side of piston 44 engages the right-hand end of adjustable stop 41. This stop is so adjusted that substantially more fluid will be accumulated in chamber 42 than is necessary to charge all the metering valves 16. Since the size of chamber 42 can thereafter no longer be increased, continued operation of pump 12 will result in a rapid buildup of pressure in this chamber as well as the connected lines, including passage 49. When the pressure increase has been sufficient, say to 100 p.s.i., the force of spring 57 will be overcome and diaphragm 55 of relief valve 15 will be moved to the right. This will open inlet port 52 of the relief valve and the fluid pressure of chamber 54 will be increased, the fluid flowing through this chamber, passage 59 and outlet port 61 to main metering valve supply conduit 87. Fluid will also flow to chamber 65 of switch 17, causing this switch to open and therefore discontinuing further operation of pump 12.

With relief valve 15 held in its open position by the fluid pressure on the large area of diaphragm 55, spring 46 will expand, moving piston 44 to the right and forcing fluid through passage 49, chamber 54, passage 59, port 61 and line 87 to metering valves 16. Fluid will also flow through line 18 and restriction 19 to T-connection 24, conduit 23 and reservoir 21. After metering valves 16 have been fully charged, this flow through line 18 will continue at a rate dependent upon the setting of restriction 19.

The pressure in chamber 54 will drop during this period, but not sufficiently to permit spring 57 to close relief valve 15. In other words, spring 46 is of sufficient strength to maintain, for example, 60 p.s.i. in chamber 54 while accumulator 14 is being discharged. After piston 44 reaches its right-hand position at the inner end of chamber 42, the fluid pressure will drop further due to continued flow through restriction 19. When the fluid pressure in chamber 54 reaches, for example, 10 p.s.i., spring 57 will cause diaphragm 55 to move to the left in FIGURE 2, closing port 52. During this time, switch 17 will still be open, since it is so adjusted as to close only when the pressure reaches a lower value, say 4 p.s.i. This will insure that port 52 is closed before pump 12 is reactuated, so that only the small area of diaphragm exposed by port 52 will be subject to the new pressure buildup.

After valve 15 closes, continued decrease of pressure due to flow through restriction 19, will be sufficient to permit switch 17 to close. This will reenergize driving means 13, and pump 12 will be reactuated to start a new cycle.

It will be noted that there are two means available for adjusting the period of the cycle. One of these is the axial position of the stop 41 as adjusted by thumb screw 43 (which determines the amount of fluid remaining to be bled off after metering valves 16 are charged), and the other is the position of needle 96 as adjusted by thumb screw 97. The setting of stop 41 will, of course, control the length of that portion of the cycle during which pump 12 is operating, while the setting of restriction 19 will determine the length of that cycle portion during which the pump is deactivated.

As indicated above, metering valves other than those illustrated could be used within the principles of the invention, and control means other than the pressure-operated electrical switch could also be used for controlling the activation and deactivation of pump 12. In fact, with proper choices of the relative flow rates of pump 12 and restriction 19, the system could be operated without the use of a pressure-responsive switch 17 or its equivalent. In other words, pump 12 could be run continuously as long as it is insured that the rate of fluid flow through return line 18 is greater than the pumping rate.

FIGURE 4 illustrates another type of driving means, generally indicated at 101, which could be used in place of driving means 13 for pump 12. The pump in this case is generally indicated at 12' and includes a housing 102 with an inlet port 103 connectible with conduit 25 and an outlet port 104 connectible with conduit 36. Housing 102 has a bore 105 for slidably receiving a pump piston 106. A seal 107 is provided at the outer end of bore 105, the inner end being connected with port 104 by a passage 108 and a check valve 109. An enlarged chamber 111 is provided in housing 102 adjacent seal 107, this chamber being connected with inlet port 103 by a passage 112.

A seal 113 at the outer end of chamber 111 engages piston 106. The piston is movable between an outer position to the left of that shown in FIGURE 4, and an inner position engageable with the inner end of bore 105. When moved to its outer position, piston 106 will cause fluid to be drawn into chamber 111 through port 103, and when it is moved to the right past seal 107, fluid in bore 105 will be forced through outlet port 104.

Driving means 101 comprises a power element (commercially available from the Dole Valve Company, Chicago, Illinois), which is indicated at 114. This element, when heated, forces a plunger 115 out of unit 114 with considerable force, and when cooled, retracts this plunger.

A bracket 116 is secured to plunger 115 and carries a toggle switch 117. This switch has two buttons 118 and 119 projecting from opposite sides of its housing. When button 118 is depressed the switch will close and it will remain closed until button 119 is depressed.

The means for depressing button 118 comprises a bracket 121 mounted on a support 122 for unit 114. The means for actuating button 119 comprises a member 123 mounted on the end of piston 106 adjacent plunger 115. Member 123 is of Z-shaped construction, one end being secured to an upward projection 124 from piston 106, and the center section being parallel to the piston and having a slot 125 slidably supporting a washer 126 carried by switch 117, the switch itself being carried by a L-shaped bracket 127 secured to member 116. A relatively strong spring 128 is disposed between members 116 and 124, a weaker spring 129 being disposed between member 124 and housing 102.

The arrangement is such that when motor 114 is relatively cool, the parts will be in a position shown in FIGURE 4, with switch 117 in its "on" position. This will cause heating of unit 114 and expansion of plunger 115. Spring 128 being stronger than spring 129, piston 106 will be driven to the right and will force fluid past check valve 109 and through port 104 to line 36. The travel of piston 106 will continue until it reaches the right-hand end of bore 105, and further elongation of plunger 115 will compress spring 128 and cause switch 117 to move to the right relative to bracket 123. Button 119 will be depressed by member 123, deenergizing unit 114. Plunger 115 will then begin to cool and contract, permitting expansion of spring 128 and then of spring 129, resulting in leftward movement of piston 106. As piston 106 moves to the left, additional fluid will flow into chamber 111 through port 103 and the passage 112. When switch 117 reaches its left-hand position, button 118 will be reengaged, reenergizing unit 114.

FIGURE 5 shows a still different driving means for the pump, which is generally indicated in FIGURE 5 by the reference numeral 12". This means comprises a solenoid generally indicated at 201 and having a coil 202 mounted on a core 203 and with an armature 204 slidably mounted therein. Energization of coil 202 will result in leftward movement of armature 204. A pump piston 205 is connected to armature 204 at 206, and a spring 207 is provided for urging piston 205 and armature 204 to the right. This spring is of the coil compression type, one end being supported by a fixed bracket 208 and the other end by the shoulder 209 of a bracket 211 slidably mounted on an extension 212 of pump housing 213. The housing also encloses check valves 214 and 215 adjacent inlet port 216 and outlet port 217, respectively.

The current supply for coil 202 in indicated at 218, and an automatically operated switch 219 is in series with this supply, as is the pressure-operated switch (not shown) in FIGURE 5. Switch 219 may be a conventional flasher unit such as is used in automobiles.

In operation, solenoid 201 will be periodically energized, and each time it is energized it will draw piston 205 to the left, causing fluid to enter pump chamber 221, and also compressing spring 207. Deenergization of solenoid 201 will permit spring 207 to expand, and piston 205 will force fluid to the accumulator.

It is thus seen that a novel and improved fluid distributing system has been provided which may utilize any of various driving means utilizing relatively little power, and in which the pump fluid may itself be used for controlling the time delay between successive pumping cycles.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a fluid distributing system, a pump having inlet and outlet ports, a source of fluid connected to said inlet port, an accumulator connected to said outlet port, said accumulator comprising a fluid collection chamber expandable in response to the injection of pressurized fluid therein, means in said accumulator for maintaining pressure on the fluid injected into said chamber, said accumulator being movable to a fully discharged position in which said pressure maintaining means is ineffective, means for limiting the expansibility of said chamber, whereby fluid force toward said accumulator after said limit is reached will raise the pressure therein, a relief valve having an inlet port connected to the pump outlet port and an outlet port, said relief valve having means normally holding it in closed position but being movable to open position in response to the attainment of a predetermined pressure at said inlet port, means for maintaining said relief valve in open position until the pressure at said outlet port is reduced to a second predetermined pressure lower than said predetermined opening pressure, driving means for said pump, control means for said driving means responsive to the attainment of a predetermined pressure at said relief valve outlet port lower than said second predetermined pressure for deactivating said pump and responsive to reduction below said last-mentioned predetermined pressure for activating said pump, a fluid receiving element of limited capacity connected to said relief valve outlet port, and a restricted bleedoff line connected to said relief valve outlet port, whereby the rate at which fluid is discharged from said accumulator may be controlled.

2. In a fluid distributing system, a pump having inlet and outlet ports, a source of fluid connected to said inlet port, an accumulator connected to said outlet port, said accumulator comprising a fluid collection chamber expandable in response to the injection of pressurized fluid therein, means in said accumulator for maintaining pressure on the fluid injected into said chamber, said accumulator being movable to a fully discharged position in which said pressure maintaining means is ineffective, means for limiting the expansibility of said chamber, whereby fluid forced toward said accumulator after said limit is reached will raise the pressure therein, a relief valve comprising an inlet port connected to said pump outlet port, a diaphragm, means urging said diaphragm to a closing position against said inlet port, a chamber on one side of said diaphragm connectible to said inlet port upon the attainment of a predetermined pressure at said inlet port which overcomes said urging means, movement of said diaphragm away from said inlet port causing a larger area thereof to be exposed to pressure in said chamber whereby the inlet port may not be reclosed until pressure in said chamber is reduced to a level below said predetermined pressure, an outlet port connected to said chamber, driving means for said pump, control means for said driving means responsive to the attainment of a predetermined pressure at said relief valve outlet port lower than said second predetermined pressure for deactivating said pump and responsive to reduction below said last-mentioned predetermined pressure for activating said pump, a fluid receiving element of limited capacity connected to said relief valve outlet port, and a restricted bleedoff line connected to said relief valve outlet port, whereby the rate at which fluid is discharged from said accumulator may be controlled.

3. In a fluid distributing system, a reservoir, a pump having an inlet port connected to said reservoir, electrically operated driving means for said pump, an accumulator having a piston slidable in a collection chamber between a discharge position and a fully charged position, resilient means urging said piston toward its discharge position, means for adjusting the stroke of said piston between said positions, a connection between said chamber and the pump outlet port, a relief valve having an inlet port connected to said pump outlet port and an outlet port, means in said relief valve responsive to the attainment of a relatively high predetermined pressure at said relief valve inlet port for opening said relief valve and responsive to reduction of pressure at said relief valve outlet port to a relatively low value for closing said relief valve, means connected to said relief valve outlet port for supplying a plurality of metering valves, a bleedoff line leading from the relief outlet port and connected to said reservoir, an adjustable restriction in said bleedoff line, and a pressure-responsive electrical switch connected to said relief valve outlet port and controlling the power supply to said pump driving means, whereby said pump will be deactivated whenever the pressure at said relief valve outlet port is above a predetermined pressure below the relatively low pressure at which said relief valve recloses.

4. In a fluid distributing system, a pump having inlet and outlet ports, an elongated body having an inlet port in the side thereof connected to the pump outlet port, a longitudinal passage in said body connected to said body inlet port, an accumulator in said body comprising a chamber to one side of said body inlet port and connected to one end of said longitudinal passage, a piston slidably mounted in said chamber, resilient means urging said piston toward the end of said chamber to which said longitudinal passage is connected, a stop adjustably mounted on the other side of said piston for limiting the movement thereof, a relief valve having an inlet port connected to the other end of said longitudinal passage, a chamber at least partially surrounding said relief valve inlet port, a diaphragm enclosing one side of said relief valve chamber and having a valve closing position engageable with said relief valve inlet port, resilient means urging said diaphragm toward its valve closing position, a relief valve outlet port connected to said relief valve chamber, means connected to said relief valve outlet port for supplying a plurality of metering valves, pressure-responsive means connected to said relief valve outlet port for deactivating said pump, and a bypass connection with an adjustable restriction leading from said relief valve outlet port to said reservoir.

5. In a fluid distributing system, a pump having inlet and outlet ports, a piston for said pump, an electric motor-driven cam for reciprocating said piston, an elongated body having an inlet port in the side thereof connected to the pump outlet port, a longitudinal passage in said body connected to said body inlet port, an accumulator in said body comprising a chamber to one side of said body inlet port and connected to one end of said longitudinal passage, a piston slidably mounted in said chamber, resilient means urging said piston toward the end of said chamber to which said longitudinal passage is connected, a stop adjustably mounted on the other side of said piston for limiting the movement thereof, a relief valve having an inlet port connected to the other end of said longitudinal passage, a chamber at least partially surrounding said relief valve inlet port, a diaphragm enclosing one side of said relief valve chamber and having a valve closing position engageable with said relief valve inlet port, resilient means urging said diaphragm toward its valve closing position, a relief valve outlet port connected to said relief valve chamber, means connected to said relief valve outlet port for supplying a plurality of metering valves, a pressure-responsive switch connected to said relief valve outlet port for deenergizing said motor, and a bypass connection with an adjustable restriction leading from said relief valve outlet port to said reservoir.

6. In a fluid distributing sytsem, a pump having inlet and outlet ports, a motor comprising a thermal unit with an expansible and contractible element connected to said pump for operating the same, a switch responsive to expansion of said thermal unit for deenergizing the unit and responsive to contraction of the thermal unit for reenergizing the unit, an elongated body having an inlet port in the side thereof connected to the pump outlet port, a longudinal passage in said body connected to said body inlet port, an accumulator in said body comprising a chamber to one side of said body inlet port and connected to one end of said longitudinal passage, a piston slidably mounted in said chamber, resilient means urging said piston toward the end of said chamber to which said longitudinal passage is connected, a stop adjustably mounted on the other side of said piston for limiting the movement thereof, a relief valve having an inlet port connected to the other end of said longitudinal passage, a chamber at least partially surrounding said relief valve inlet port, a diaphragm enclosing one side of said relief valve chamber and having a valve closing position engageable with said relief valve inlet port, resilient means urging said diaphragm toward its valve closing position, a relief valve outlet port connected to said relief valve chamber, means connected to said relief valve outlet port for supplying a plurality of metering valves, a pressure-responsive switch connected to said relief valve outlet port for deenergizing said motor, and a bypass connection with an adjustable restriction leading from said relief valve outlet port to said reservoir.

7. In a fluid distributing system, a pump having inlet and outlet ports, a motor comprising a solenoid connected to said pump for actuating the same, a flasher switch connected to said solenoid for periodically energizing and deenergizing the solenoid, an elongated body having an inlet port in the side thereof connected to the pump outlet port, a longitudinal passage in said body connected to said body inlet port, an accumulator in said body comprising a chamber to one side of said body inlet port and connected to one end of said longitudinal passage, a piston slidably mounted in said chamber, resilient means urging said piston toward the end of said chamber to which said longitudinal passage is connected, a stop adjustably mounted on the other side of said piston for limiting the movement thereof, a relief valve having an inlet port connected to the other end of said longitudinal passage, a chamber at least partially surrounding said relief valve inlet port, a diaphragm enclosing one side of said relief valve chamber and having a valve closing position engageable with said relief valve inlet port, resilient means urging said diaphragm toward its valve closing position, a relief valve outlet port connected to said relief valve chamber, means connected to said relief valve outlet port for supplying a plurality of metering valves, a pressure-responsive switch connected to said relief valve outlet port for deenergizing said motor, and a bypass connection with an adjustable restriction leading from said relief valve outlet port to said reservoir.

References Cited by the Examiner

UNITED STATES PATENTS

| | | | |
|---|---|---|---|
| 2,410,132 | 10/1946 | Smisko | 137—525 X |
| 2,597,137 | 5/1952 | Tear | 184—7 |
| 2,804,241 | 8/1957 | McDowall et al. | 222—335 |

LAVERNE D. GEIGER, *Primary Examiner.*

H. S. BELL, *Assistant Examiner.*